United States Patent [19]

Sundet et al.

[11] Patent Number: 5,350,620
[45] Date of Patent: Sep. 27, 1994

[54] FILTRATION MEDIA COMPRISING NON-CHARGED MELTBLOWN FIBERS AND ELECTRICALLY CHARGED STAPLE FIBERS

[75] Inventors: Douglas C. Sundet; Albert H. Fox, both of St. Paul, Minn.

[73] Assignee: Minnesota Mining and Manufacturing, Saint Paul, Minn.

[21] Appl. No.: 824,994

[22] Filed: Jan. 24, 1992

Related U.S. Application Data

[63] Continuation of Ser. No. 436,236, Nov. 14, 1989, abandoned.

[51] Int. Cl.$^5$ .................. B01D 39/02; D04H 1/04; D04H 1/58; B32B 3/28
[52] U.S. Cl. .................... 428/172; 55/527; 55/DIG. 39; 428/181; 428/213; 428/219; 428/288; 428/296; 428/297; 428/303; 428/359; 428/903; 96/98
[58] Field of Search .............. 428/74, 226, 227, 228, 428/283, 293, 296, 297, 303, 311.1, 359, 369, 372, 401, 172, 181, 213, 219, 288, 903; 55/155, 320, 323, 350, 494, 512, 516, 527, 528, DIG. 39

[56] References Cited

U.S. PATENT DOCUMENTS

| | | | |
|---|---|---|---|
| 3,016,599 | 1/1962 | Perry, Jr. .................................. | 28/78 |
| 3,849,241 | 11/1974 | Butin et al. ............................ | 428/137 |
| 3,920,428 | 11/1975 | Kinsley, Jr. ............................ | 55/528 |
| 4,103,058 | 7/1978 | Humlicek ............................ | 428/171 |
| 4,118,531 | 10/1978 | Hauser ............................ | 428/224 |
| 4,215,682 | 8/1980 | Kubik et al. .................... | 128/205.29 |
| 4,286,977 | 9/1981 | Klein ................................... | 55/524 |
| 4,375,718 | 3/1983 | Wadsworth et al. ............. | 29/592 E |
| 4,392,876 | 7/1983 | Schmidt ............................. | 55/524 |
| 4,547,420 | 10/1985 | Krueger et al. ..................... | 428/229 |
| 4,729,371 | 3/1988 | Krueger et al. ................. | 128/206.19 |
| 4,824,451 | 4/1989 | Vogt et al. ............................ | 55/528 |
| 4,874,399 | 10/1989 | Reed et al. ................................. | 55/2 |
| 4,948,515 | 8/1990 | Okumura et al. ................... | 210/748 |
| 4,988,560 | 1/1991 | Meyer et al. ........................ | 428/297 |

FOREIGN PATENT DOCUMENTS 0138556  4/1985 European Pat. Off. .
57-105217A  6/1982 Japan .

OTHER PUBLICATIONS

European Search Report.
Koch Filter Corporation Bulletin No. K-186A.
ASHRAE Standard No. 52-76.

Primary Examiner—James D. Withers
Attorney, Agent, or Firm—Gary L. Griswold; Walter N. Kirn; David L. Weinstein

[57] ABSTRACT

Filtration material comprising a web comprising meltblown fibers and staple, electrically charged fibers randomly dispersed among the meltblown fibers. The filtration material can be formed in planar configurations and in configurations other than planar. Non-planar configurations can extend the useful working area for a given filter element's cross-section without requiring an additional corrugating or pleating process step. The filtration material exhibits high strength and low pressure drop.

14 Claims, 3 Drawing Sheets

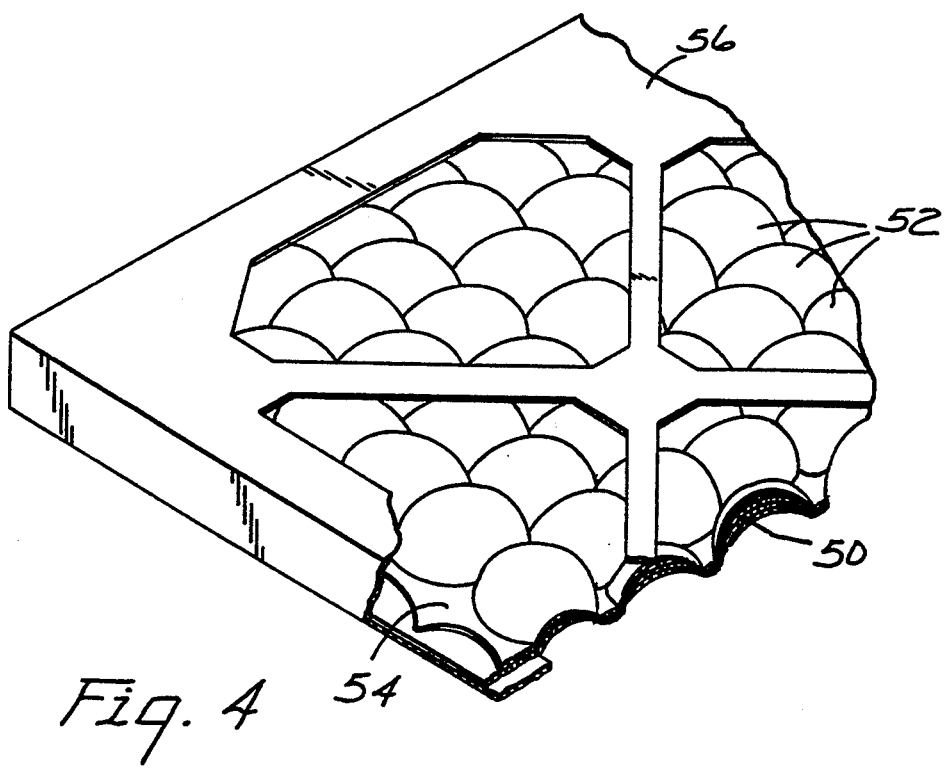
Fig. 4
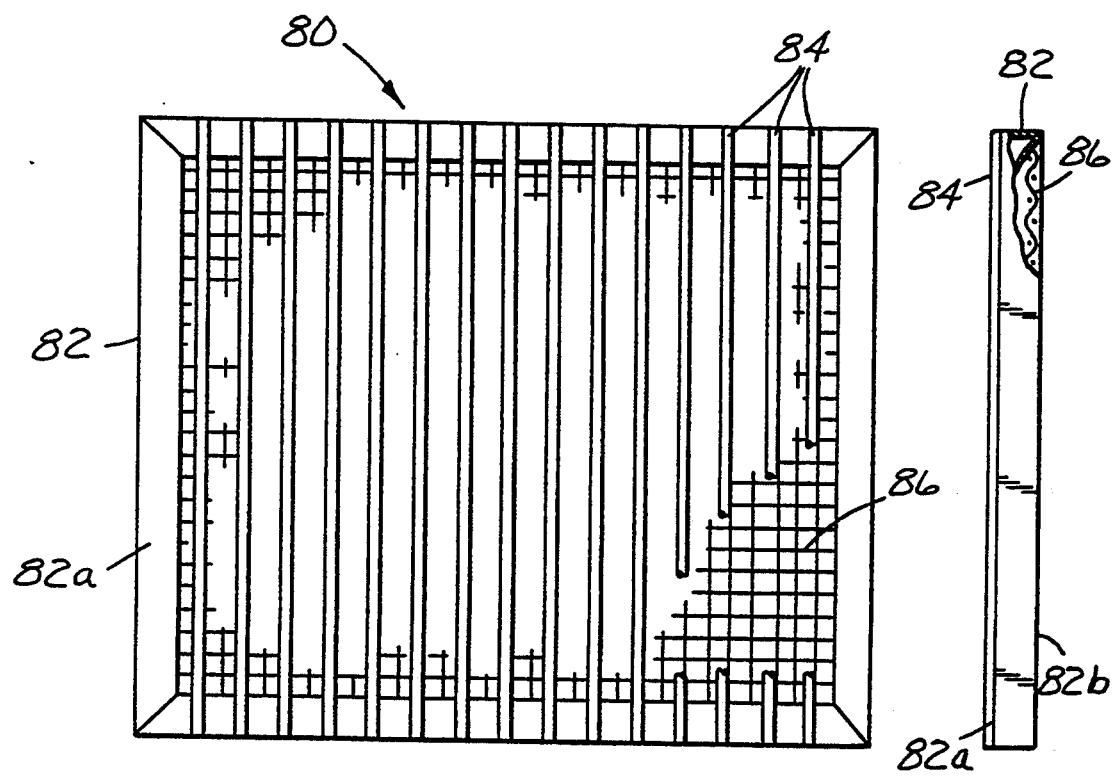
Fig. 7                     Fig. 7A

FILTRATION MEDIA COMPRISING NON-CHARGED MELTBLOWN FIBERS AND ELECTRICALLY CHARGED STAPLE FIBERS

This is a continuation of application No. 07/436,236 filed Nov. 14, 1989, now abandoned.

BACKGROUND OF THE INVENTION

1. Field of the Invention

The present invention relates to filtration material, more particularly, filtration material that is suitable for air filtration in heating, ventilating, and air conditioning systems.

2. Discussion of the Art

The primary objective of a high performance air filter is to provide maximum particle removal while maintaining an acceptable pressure drop. Conventional fibrous filters obtain improved particle removal efficiency by using filaments having small diameter, which can be packed closely together. This close packing results in smaller voids between the fibers, which increases the probability that particles will be intercepted by a fiber. This increase in particle removal is, however, accompanied by an increase in pressure drop. Excessive pressure drops can restrict air flow and shorten filter life.

The use of electrostatic fibers can improve particle removal without affecting pressure drop or filter life. The charge on the fiber enhances particle removal efficiency by attracting particles or aerosols to the fiber. Therefore, a filter made from electrostatic fibers has a higher particle removal efficiency with the same pressure drop and dust holding capacity as a filter made from an uncharged web having the same mechanical construction.

Japanese patent application JP57-105217 A discloses air filter material comprising electret fibers of rectangular cross-section combined with staple, uncharged fibers of small diameter. The staple, uncharged fibers can be made of glass, polyester, polypropylene, or other fiber-forming materials. Pleated filters made from this media are not suitable for use with conventional heating, ventilating, and air conditioning systems because the pressure drop across the media is too great at air velocities normally encountered in such systems. Furthermore, additional processes are required, e.g., needle punching or addition of support layers, in order to realize strength characteristics approaching those suitable for filter materials for residential heating, ventilating, and air conditioning systems.

U.S. Pat. Nos. 3,016,599 and 4,118,531 describe articles formed from combinations of staple and meltblown fibers; however, none of these patents disclose filter materials suitable for residential heating, ventilating, and air conditioning systems.

U.S. Pat. No. 4,729,371 discloses that webs may be electrically charged to enhance their filtration capabilities, as by introducing charges into the fibers as they are formed or by charging the web after formation thereof; however, it is difficult to obtain a high level of charge by the process of that patent.

SUMMARY OF THE INVENTION

The present invention provides a novel air filtration material, articles fabricated from that material, and a process for making that material. The filtration material and articles prepared therefrom are particularly suitable for use with typical commercial or residential heating, ventilating, and air conditioning systems.

The material of the present invention comprises a web comprising (a) meltblown fibers and (b) staple, electrically charged fibers randomly dispersed among the meltblown fibers. The web contains from about 10% to about 80% by weight, preferably from about 20% to about 50% by weight, electrically charged fibers. The diameter or major cross-section dimension of the meltblown fibers ranges from about 10 to about 30 micrometers. The diameter or major cross-section dimension of the staple fibers ranges from about 10 to about 80 micrometers, and the length of the staple fiber ranges from about 6.5 mm to about 50 mm. The pressure drop of the web ranges from about 24.9 pascals (Pa) to about 74.7 pascals (Pa) when tested at an air velocity of 0.91 m/sec. The tensile strength of the web is preferably at least about 0.25 kg for a 76.2 mm wide strip. The web material of this invention is especially useful for preparing heating, ventilating, and air-conditioning filters.

The process of this invention allows filtration materials to be formed in both planar configurations and in nonplanar configurations. The process of forming the web of this invention comprises the step of combining staple, electrically charged fibers and meltblown fibers, such that said electrically charged fibers are randomly dispersed among said fibers. The meltblown fibers can be formed by extruding a molten mass of polymeric or glass material through a row of side-by-side orifices in a die into a high-velocity gaseous stream, whereby the extruded material is attenuated and drawn to form a stream of meltblown fibers. After the web of electrically charged fibers and meltblown fibers is formed, the web can be collected on a collector, e.g., on a drum or on one or more screen-like elements attached to a drum. The collector can have a configuration that provides either planar or non-planar filtration material.

One of the major advantages of the process of this invention is that by allowing formation of materials of non-planar configuration, the performance of a filtration article of a given area, e.g., of the dimensions of an air duct slot, can be enhanced without the need for additional processing steps that add to the cost of the article.

Because the staple fibers are dispersed among the continuous fibers, addition of support layers or conventionally used processing operations, such as needle punching, are not needed to produce filtration articles having the strength, porosity, and pressure drop characteristics desired.

BRIEF DESCRIPTION OF THE DRAWINGS

FIG. 4 is a perspective view, partially in section, of a portion of an illustrative non-planar web of the present invention.

FIG. 7 is a plan view of a portion of a collector suitable for use in the present invention.

FIG. 7A is an end view of the collector of FIG. 7.

DETAILED DESCRIPTION OF THE INVENTION

Figure 1:
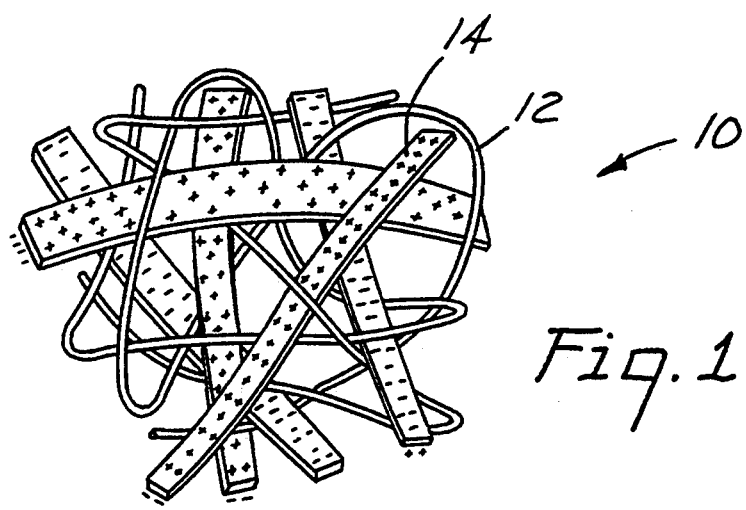
FIG. 1 is a schematic view, greatly enlarged, of a portion of a web of the present invention.

Referring now to FIG. 1, web 10 of the present invention comprises (a) continuous, meltblown fibers 12, and (b) staple, electrically charged fibers 14 randomly dispersed among meltblown fibers 12. The term "meltblown fiber" means a fiber formed from a molten polymer or glass by means of extrusion equipment having a high-velocity gaseous stream to attenuate and draw the fibers. The term "staple fiber" means a natural or synthetic fiber of relatively short length. The term "electrically charged fibers" includes (a) fibers bearing a positive charge only, (b) fibers bearing a negative charge only, and (c) fibers comprising a dielectric body in which a permanent state of polarization has been set up.

Meltblown fibers 12 can be formed from polymeric materials or glass materials. It is preferred that fibers 12 be formed of polymeric materials. Polymeric, meltblown fibers suitable for this invention can be selected from any fiber-forming polymer. Representative examples of such polymers include polyolefin, e.g., polypropylene, polyethylene, polymethylpentene, polyester, and polyurethane. The shape of cross-section of fibers 12 can range from elliptical to circular, and the diameter or major cross-section dimension of fibers 12 can range from 0.1 micrometer to 50 micrometers. The preferred diameter is at least about 10 micrometers. As diameter increases, the quality of filters made therefrom also increases. Of course, meltblown fibers cannot be of infinite length, but it is preferred that the average length to diameter ratio of the fibers exceed 5000:1.

Staple, electrically charged fibers 14 can be formed from materials that have acquired a charge be it positive only, negative only, or both positive and negative, e.g., polarized. A given web can contain one or more of the foregoing classes of electrically charged fibers. It is preferred that staple, electrically charged fibers 14 be formed from polymeric materials. Representative examples of commercially available electrically charged fibers suitable for this invention include "FILTRETE" fibers, commercially available from Minnesota Mining and Manufacturing Company. "FILTRETE" fibers are electret fibers, i.e., fibers in which a permanent state of electric polarization has been set up.

The percentage, by weight, of staple, electrically charged fibers 14 in web 10 can range from about 10% to about 80% of the total weight of web 10. The percentage of staple, electrically charged fibers 14 in web 10 preferably ranges from about 20% to about 50%, based on the weight of web 10. Webs having lower amounts of staple, electrically charged fibers have higher strength and integrity, while webs having higher amounts of staple, electrically charged fibers have superior filtering capabilities. The optimum percentage of staple, electrically charged fibers 14 in web 10 appears to be from about 25% to about 25% of the total weight of web 10.

The length of the staple fibers can range from about 6.5 mm to about 50 mm, and the diameter or major cross-section dimension of the staple fibers can range from about 10 micrometers to about 80 micrometers.

The permanent charge sites on staple, electrically charged fibers 14 attract and capture particulate materials, contributing to a high efficiency of air filtration.

Meltblown fibers 12 are intertwined about each other and about the staple, electrically charged fibers 14, physically holding web 10 together, as well as providing filtration surfaces. This combination of fibers provides media for filtering air having relatively high efficiency, low pressure drop, and good mechanical strength.

Pressure drop is an important factor in determining the adequacy of a filtration article. The air resistance of a planar web 10 suitable for use in a pleated filter can range from about 12.4 pascals (Pa) to about 747 pascals (Pa) (pressure drop at 0.91 m/sec air velocity). It is preferable that the initial filter resistance of a pleated filter for heating, ventilating, and air conditioning range from about 24.9 pascals (Pa) to about 74.7 pascals (Pa) at about 1.52 m/sec air velocity. In order for the resistance of the pleated filter to be in this range, the planar web from which the filter is made should have a pressure drop of from about 24.9 pascals (Pa) to about 74.7 pascals (Pa) when tested at an air velocity of 0.91 m/sec.

Tensile strength of a web of filtration material of this invention is preferably sufficient to withstand air velocities encountered in typical commercial and residential filtration operations, e.g., 1.52 m/sec. The tensile strength of a web of filtration material of this invention is preferably at least about 0.25 kg per 76.2 mm width, and more preferably about 0.50 kg per 76.2 mm width. The tensile strength of webs containing a mixture of staple, electrically charged fibers and meltblown fibers combined by the process of this invention is higher than that of similar mixtures containing only staple fibers made solely by means of carding or air-laying equipment.

The weight per unit area of web 10 can range from about 30 g/m$^2$ to about 400 g/m$^2$. The loft of web 10 can range from about 0.5 mm to about 25.4 mm.

The webs of this invention formed in a non-planar configuration have increased surface area relative to webs of the prior art. The increased surface area improves the filtration properties of the webs. The surface area of web 10 can range from 1 times the face area thereof to about 50 times the face area thereof.

The Initial Dust Spot Efficiency of the webs of this invention can range from 10% to 95%. Initial Dust Spot Efficiency is measured in accordance with Test Method Number 52-76, American Society of Heating, Refrigerating, and Air-Conditioning Engineers, Inc. It is preferred that Initial Dust Spot Efficiency be at least 20%.

A good overall measure of filtration performance of a web is the "Quality Factor" (Q) because this factor is based on both efficiency and pressure drop. Quality Factor (Q) is defined mathematically by the expression $$Q = \frac{-\ln(\% \ DOP \ Penetration/100)}{\Delta P}$$

where "DOP Penetration" represents the percentage of dioctyl phathalate particles having a size of 0.3 micrometers that pass through the web, as measured by TDA-100 Aerosol Penetrometer, Air Techniques, Inc., Baltimore, Md., "$\Delta P$" represents the pressure drop in pascals (Pa), and "ln" indicates the natural logarithm. This value of Quality Factor (Q) is always positive and increases with reduced penetration. Conversely, as pressure drop increases, the value of Quality Factor (Q) decreases. The Quality Factor (Q) can range from about 0.05 $Pa^{-1}$ to about 5 $Pa^{-1}$, and it is preferred that the value of Quality Factor (Q) be at least about 0.1 $Pa^{-1}$.

Figure 2:
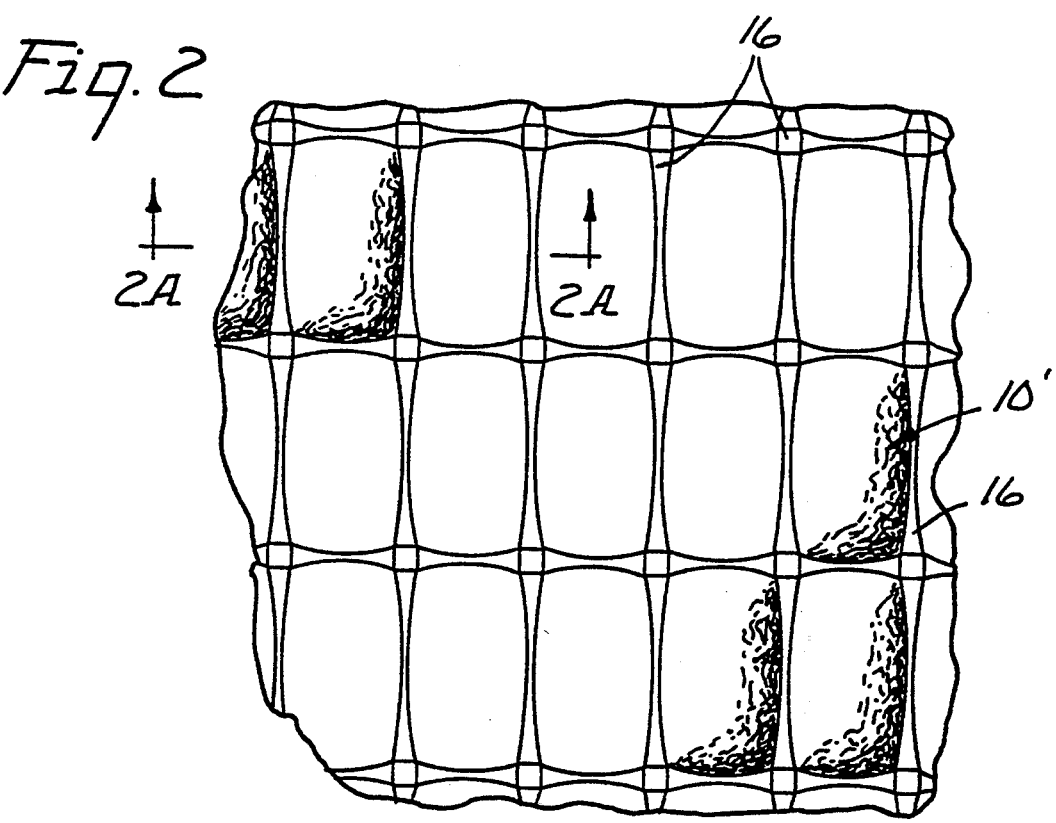
FIG. 2 is a plan view of a web of the present invention adhered to a wire mesh collecting screen.
Figure 2A:
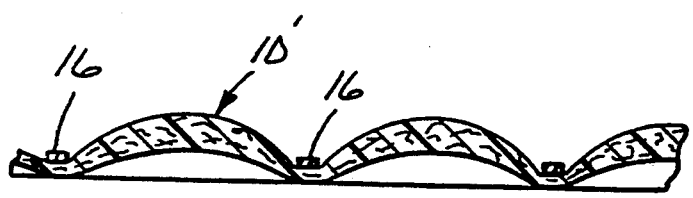
FIG. 2A is a sectional view along the line 2A—2A of FIG. 2.

Preferred parameters for a filter for heating, ventilating, and air conditioning are as follows:

Composition of meltblown fibers: Polypropylene
Shape of cross-section of meltblown fibers: Circular
Diameter or major cross-section dimension of meltblown fibers: 10 micrometers to 30 micrometers
Composition of staple, electrically charged fibers: polyolefin, polytetrafluoroethylene, polymethylpentene, polycarbonate, polyvinylidene fluoride
Shape of staple, electrically charged fibers: rectangular, circular, elliptical
Length of staple, electrically charged fibers: 6.5 mm to 50 mm
Diameter or major cross-section dimension of staple, electrically charged fibers: 10 micrometers to 80 micrometers
Amount of staple, electrically charged fibers in web: 10% to 80%
Air resistance of web (pressure drop at 0.91 m/sec): 24.9 Pa to 74.7 Pa
Surface area of web: 1 times the face area to 3 times the face area
Weight of web: 40 $g/m^2$ to 150 $g/m^2$
Loft of web: 1 mm to 5 mm
Tensile strength of web: At least 0.50 kg for a 76.2 mm wide strip
Initial Dust Spot Efficiency: 10% to 60%
Quality Factor: 0.1 $Pa^{-1}$ to 3 $Pa^{-1}$ The filtration material of this invention can be formed in a planar, flat web, by collecting the web of combined fibers on a flat, porous screen having relatively small openings. Alternatively, the filtration material of this invention can be made in a three-dimensional configuration in order to obtain increased filtration surface area. The three-dimensional shape can be obtained by collecting web 10' of combined fibers on a screen 16 having openings of such dimensions that portions of the material of the web are forced to protrude through these openings (see FIGS. 2 and 2A).

The physical strength properties of the filtration material of this invention enable it to be used in air filters without resorting to additional strength enhancing operations, such as, for example, needle punching, attaching to scrims, etc.

The filtration material of this invention can be used for many applications in air filtration. Examples of these applications include heating, ventilating, and air conditioning filters for homes and commercial buildings. Such filters include panel filters, pleated panel filters, bag filters, cartridge filters, high efficiency particulate air (HEPA) filters. Other applications for these filters include clean room filters, filters for filtering combustion air for machinery, e.g., automobiles, filters for electronic equipment, and filters for personal respirators.

The filtration material of this invention is superior to that disclosed in the prior art in that it possesses superior strength and handling characteristics for a given thickness and weight and more appropriate pressure-drop characteristics relative to its air filtering capabilities. The tensile strength of the webs containing staple, electrically charged fibers and meltblown fibers is higher than that of webs made entirely of staple fibers.

Surprisingly, it has been discovered that the value of Average Dust Spot Efficiency (measured by testing in accordance with Test Method Number 52-76, American Society of Heating, Refrigerating, and Air-Conditioning Engineers, Inc.) for the filtration material of this invention exceeds that value for filtration material made solely from electrically charged fibers that have the same (or greater) weight of electrically charged fibers per unit area.

Another aspect of this invention involves a process for preparing filtration materials and articles of this invention. In general, meltblown fibers 12 are formed by extruding molten polymeric or glass material through a die which contains a multiplicity of small orifices. Upon emerging from the die, the molten polymeric or glass material is formed into fine, continuous filaments or fibers, which are cooled by the high-velocity air used to draw the fibers and transport them to a collector, e.g., a drum or a belt. A web of electrically charged fibers is separated into staple, electrically charged fibers 14, which are subsequently ejected into the converging stream of meltblown fibers 12 before fibers 12 contact the collector.

The fiber-blowing portion of the illustrated apparatus can be a conventional structure as taught, for example, in Wente, van A. "Superfine Thermoplastic Fibers," in Industrial Engineering Chemistry, Vol. 48, pages 1342 et seq (1956), or in Report No. 4364 of the Naval Research Laboratories, published May 25, 1954, entitled "Manufacture of Superfine Organic Fibers" by Wente, V. A.; Boone, C. D.; and Fluharty, E. L. Such a structure includes a die 20 which has an extrusion chamber 22 through which liquefied fiber-forming material is advanced; die orifices 24 arranged in line across the forward end of the die 20 and through which the fiber-forming material is extruded; and cooperating gas orifices 26 through which a gas, typically heated air, is forced at very high velocity. The high-velocity gaseous stream draws out and attenuates the extruded fiber-forming material, whereupon the fiber-forming material solidifies as fibers during travel to a collector 28. The collector 28 is typically a finely perforated screen, which can be in the form of a flat screen or a drum or cylinder, but which can take alternative forms, such as a closed-loop belt.

The velocity of the gas streams carrying the fibers to the collector may be varied. Manifold pressures (pressure of gas prior to introduction to die) generally less than about 25 lbs/sq in gauge, (or 2 $kg/cm^2$), and preferably less than about 15 lbs/sq in gauge (or 1 $kg/cm^2$), may be used when the air-delivery orifice has a width of 0.3 mm, so that the fibers are not driven into the perforations of the collector too forcefully. Generally the air manifold pressure is more than about 4 lbs/sq in gauge (0.3 $kg/cm^2$) and preferably more than about 6 lbs/sq in gauge (0.4 $kg/cm^2$) when the air-delivery orifice has a width of 0.3 mm. The highest velocities can be used when the collection distance is large, and the specific velocity used is often chosen by varying the velocity and collection distance on a trial basis for a given collector.

Gas-withdrawal apparatus may be positioned behind the screen-like element of the collector to assist in deposition of fibers and removal of gas.

The electrically charged fibers can be introduced into the stream of meltblown fibers in the illustrative apparatus shown in FIG. 4 through use of a lickerin roll 30 disposed above the fiber-blowing apparatus. A web 32 of electrically charged fibers is propelled along a table 34 under a drive roll 36 where the leading edge engages against the lickerin roll.

The lickerin roll 30 has rotating teeth to chop, separate, or open the entering web of electrically charged fibers into individual fibers, and an air stream to blow the fibers out into the stream of meltblown fibers. The lickerin roll is fed by a web of electrically charged fibers which is either (a) roll goods of needle tacked web of electrically charged fibers, or (b) a loose web of electrically charged fibers.

The lickerin roll 30 turns in the direction of the arrow and picks off fibers from the leading edge of the web, separating the fibers from one another. The picked fibers are conveyed in an air stream through an inclined trough or duct 38 and into the stream of meltblown fibers where they become mixed with the meltblown fibers. The air stream is generated inherently by rotation of the lickerin roll, or that air stream may be augmented by use of an auxiliary fan or blower operating through a duct 40 as known in the art.

The mixed stream of meltblown fibers and electrically charged fibers then continues to the collector 28 where the meltblown and staple fibers form a web of randomly intermixed and intertangled fibers. Under close examination, the meltblown fibers and electrically charged fibers are found to be thoroughly mixed; for example, the web is free of clumps of electrically charged fibers, i.e., collections one centimeter or more in diameter of many electrically charged fibers, such as would be obtained if a chopped section of multi-ended tow of electrically charged filament were unseparated or if electrically charged fibers were balled together prior to introduction into the stream of meltblown fibers. The web is peeled off the collector 28, and typically wound into a storage roll 42. Subsequently, the web can be processed in cutting or handling operations.

A detailed description of a general process that can be used to combine staple fibers and meltblown fibers can be found in U.S. Pat. No. 4,118,531, columns 4 and 5, and associated FIGS. 1 and 2, incorporated herein by reference. The crimped fibers of the process disclosed in U.S. Pat. No. 4,118,531 are replaced by electrically charged fibers in the process of the present invention.

In the present invention, the staple, electrically charged fibers are preferably combined with the meltblown fibers a short distance from where the meltblown fibers emerge from the die. Because the meltblown fibers are widely spaced at this point, the converging staple, electrically charged fibers become uniformly distributed and entangled with the meltblown fibers. The staple, electrically charged fibers are entangled in the matrix formed by the meltblown fibers, with the result that the web formed by the process of this invention is uniform and exhibits mechanical integrity.

The collection distance, that is, the distance between the die orifices and the collector may also be varied to vary, for example, the depth of penetration by fibers into the perforations of the collection screen and consequently the height of the pillows formed in the web. As the opening size in the collection screen is increased, the distance from collection screen to die may also be increased. The ratio between the collector distance and the diameter of the opening usually ranges between about 5:1 and 30:1. The collector distance will generally be not less than about 2 cm, and preferably not less than about 4 cm, in a meltblowing operation, so that the regions collected on the lands of the collection screen will be fibrous rather than film-like, and therefore will provide a filtration surface area. It is typical to use collection distances of about 30 cm, and preferably the collection distances are greater than 15 cm, so as to provide a rather uniform distribution of fibers over the collection area.

Referring now to FIG. 4, web 50 having a configuration characterized by large pillows or bubbles 52 can be made by collecting the web on a screen-like element 54 having large openings therethrough (e.g., 3.81 cm in diameter). When the openings in screen-like element 54 are relatively large, it is preferable to place a second screen-like element (not shown) in register with screen-like element 54 and on the side of element 54 opposite to the side of element 54 that faces the die. The function of the second screen-like element is to prevent the pillows or bubbles 52 from acquiring excessive depth and to round off the plateaus of the pillows or bubbles 52.

When web 50 is collected on screen-like element 54, element 54 may be left in place to serve as a support in filtration articles fabricated from web 50. Alternatively, collected web 50 may be removed from screen-like element 54, with the latter then being recycled as in a belt-type collector. For commercial purposes, the assembly of web 50 and element 54 can be placed in a frame 56, which frame is typically made of cardboard.

In the process of this invention, webs having pillowed regions having approximately the same thickness as the thickness of the web in the land areas can be formed, while the integrity and strength of the pillowed regions can be maintained. The ability to create an essentially uniform cross-section results in being able to provide greater effective filter surface area with less material and to fabricate filtration articles with low pressure drop characteristics.

Figure 5:
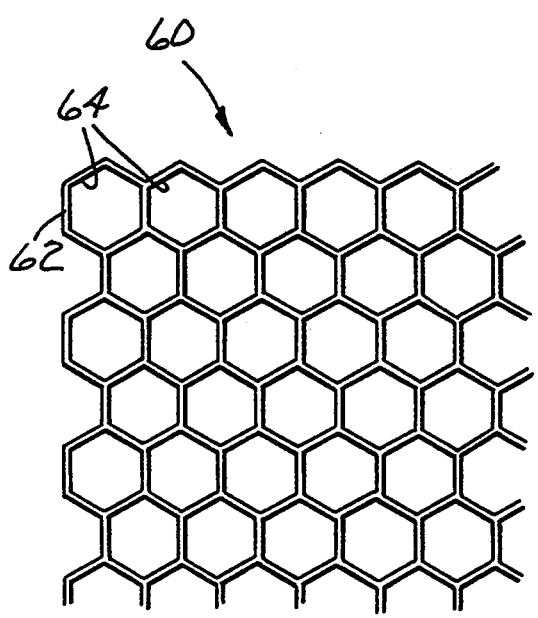
FIG. 5 is a plan view of a portion of a screen-like element suitable for use in the present invention.
Figure 6:
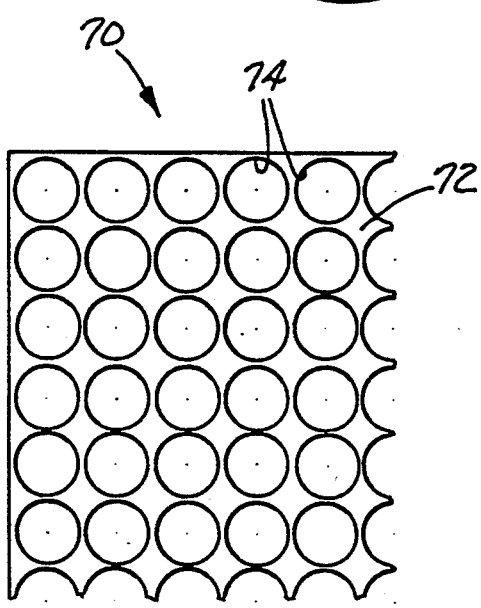
FIG. 6 is a plan view of a portion of a screen-like element suitable for use in the present invention.

Some of the useful collection screens are shown in plan view in FIGS. 5 and 6. The collection screen shown in FIG. 5 may be either a honeycombed screen 60, in which the only land area 62 consists of the edges of thin walls that divide the honeycomb cells 64, or a flat plate having hexagonal openings stamped in it. However, collection screens 70 having larger land areas 72 are also useful, and perforations 74 may be configured, as the perforations of the screen shown in FIG. 6 to provide pillows of a desired shape. The land area of useful collection screens can vary widely, from as little as a tenth of a percent to 90% percent of the whole area of the screen. Preferably, it is less than about 60% of the whole area of the screen, and often is about 1-5%. where the land area is small, the opening size in the screen may also be small, for example, as small as 2 or 3 mm, though it is usually 5 mm or more.

It is common for commercial and residential heating, ventilating, and air conditioning systems to have a duct slot for accommodating filters that are approximately 25.4 mm thick. Although the process of this invention is not constrained by this consideration, it is advantageous and preferred to operate the process of this invention in a manner such that the resulting pillowed web can be inserted in the common-sized slot and that the frequency of land areas between pillowed areas is low enough to result in an effective increase in the filtering area of the filter.

One specific procedural embodiment for making filtration material suitable for commercial and residential heating, ventilating, and air conditioning systems involves a collecting device having the following elements:

(1) A wire mesh screen having openings approximately 6.4 mm square positioned on a collecting drum.

(2) A wire mesh screen having hexagonal openings with a cell size approximately 27.5 mm, flat-to-flat, separated from the aforementioned metal screen by cylindrical wooden dowels approximately 6.4 mm in diameter and approximately 20 mm long bonded between the two screens in a rectangular pattern to function as spacers. Adjacent dowels are approximately 120 mm apart. The wire mesh screen having hexagonal openings has an appearance similar to that of the screen-like element of FIG. 5.

The web that is formed by the melt-blowing process first contacts the wire mesh screen having hexagonal openings and is restrained by the wire mesh screen having square openings. The resulting web has pillowed regions of a slightly flattened hemispherical shape, with the fibers in the mixture thoroughly entangled and the mixture of fibers being essentially homogeneous throughout the pillowed regions. When a similar mixture of fibers is blown onto the same type of wire mesh screen having hexagonal openings as described above, but having no restraining wire mesh screen having square openings positioned behind it, to produce a web of similar weight, the pillowed regions form into elongated cones with the fibers showing decreasing entanglement and the mixture of fibers showing decreasing homogeneity towards the apexes of the cones.

Another specific procedural embodiment of the process of this invention involves a collecting device in which an aluminum honeycomb material ("Hexcel ACG-¾", Hexcel, Dublin, Calif.) covers a collecting drum. This honeycomb material has hexagonal cells, e.g., with a flat-to-flat cell size of approximately 19 mm and a thickness of approximately 16 mm. The honeycomb material has an appearance similar to that of the screen-like element of FIG. 5. The web that is formed by the melt-blowing process is collected on the aluminum honeycomb material to produce a pillowed web. The resulting pillowed regions have the approximate dimensions of the honeycomb cells at their outer surfaces and the fibers in the pillowed regions are thoroughly entangled and the mixture of fibers is essentially homogeneous.

Another specific embodiment of a collector suitable for use in the process of this invention is shown in FIG. 7. In this embodiment, webs having ribs or pleats can be made by using a collector 80 comprising a frame 82 having a front side 82a and a back side 82b. Parallel rods 84 attached to front side 82a of frame 82 extend transversely across the opening in frame 82. A wire mesh screen 86 attached to back side 82b of frame 82 completely covers the opening in frame 82. When a web of this invention is forced to contact rods 84 of front side 82a and to be restrained by screen 86 of back side 82b, the web will assume a ribbed or pleated configuration. The assembly of frame 82, rods 84, and screen 86 can be used to collect the web as it emerges from the die. Alternatively, the collector can be in the form of a drum having parallel rods arranged on the periphery thereof, and attached thereto, so as to intercept the web as it emerges from the die, thereby causing the web to assume a ribbed or pleated configuration. In effect, the drum is equivalent to frame 82 that has been modified to an arcuate form. The conventional way to increase the surface area of typical air filters is to provide a flat material, and, in a separate operation, to pleat the material and insert it into a frame. In this embodiment of the method of the present invention, a ribbed or pleated web having extended surface area can be made by means of collector 80 in a single operation.

The process of this invention for making filtration material is superior to those of the prior art in that it is integrated, thereby requiring fewer steps. The processes of the prior art can generally only provide webs whose strength must be enhanced by additional process steps.

The process of this invention is particularly useful for manufacturing a web comprising staple, electrically charged fibers and meltblown non-charged fibers, because the static charge on electrically charged fibers makes them very difficult to process in conventional equipment, such as a "RANDO-WEBBER" web-forming apparatus. Furthermore, webs made by conventional web-forming apparatus have low strength. Because needle-punching and hydro-entanglement can improve the strength of a web by only a small amount, and because thermal bonding methods cannot be used with electrically charged fibers because heat neutralizes the electrical charge of the fibers, the process of this invention is advantageous.

Another advantage of the process of this invention is that webs can be formed into many different designs or patterns in addition to conventional planar webs. For example, by collecting the web by means of a screen having relatively small openings (e.g., 0.64 cm in diameter), the resulting web will have pillows or bubbles protruding from one side of the web, which pillows or bubbles correspond to the openings in the screen. The openings in the screen can have various shapes, e.g., round, square, hexagonal, triangular, etc. The protrusion of the web into the openings in the screen creates a three-dimensional appearance. The material of this invention can be used for pleated air filters for commercial or residential heating, ventilating, and air conditioning systems. These systems require filters to have sufficiently high permeability to allow adequate delivery of air.

The electrical properties of the staple, electrically charged fibers are not lost or diminished by the process of this invention.

The following, non-limiting examples further illustrate the filtration articles of this invention.

EXAMPLES

The following properties of the webs in the examples were determined: initial resistance, Initial Dust Spot Efficiency, Atmospheric Dust Spot Efficiency, dust-holding capacity, arrestance, basis weight, thickness, permeability, dioctyl phthalate (DOP) penetration efficiency, tensile strength, and fiber diameter.

Initial resistance is the resistance of a clean device, i.e., filtration material, operating at its rated air flow rate. In the following examples, air flow rate was 0.91 m/sec.

Atmospheric Dust Spot Efficiency, hereinafter Dust Spot Efficiency, is a measure of the ability of the filtration material to remove atmospheric dust from test air. Atmospheric dust is the particulate matter naturally occurring in the air supplied to the test duct. Both Initial Dust Spot Efficiency and Average Dust Spot Efficiency were determined.

Dust-holding capacity is the amount of synthetic dust fed to the device, i.e., filtration material, being tested times its average arrestance until either of the following conditions occur: (a) resistance of test device reaches the rated final resistance, (b) two consecutive arrestance values are less than 85% of maximum arrestance value, but in no case may the dust-holding capacity be calculated including a dust increment that corresponds to any arrestance value which has decreased to 75% or less of maximum.

Arrestance is a measure of the ability of the test device to remove injected ASHRAE synthetic dust from the test air. It is calculated as a percentage relationship on a weight basis. ASHRAE synthetic dust consists of 72% standardized air-cleaner test dust fine, 23% by weight Molocco black, 5% by weight No. 7 cotton linters ground in a Wiley mill with a 4 mm screen.

Rated final resistance is the maximum operating resistance of the device at rated air flow rate.

The definitions of initial resistance, Atmospheric Dust Spot Efficiency, atmospheric dust, dust-holding capacity, arrestance, and ASHRAE synthetic dust are discussed in greater detail in ASHRAE Standard 52-76 (1976), The American Society of Heating, Refrigerating, and Air-Conditioning Engineers, Inc., incorporated herein by reference.

Basis weight was calculated by weighing a predetermined size of the web on an electronic balance capable of measuring to the nearest 0.01 g and expressing the result in $g/m^2$.

Thickness, or loft, was determined by measuring the distance between two discs that exert a compressive force of $0.1 \ g/cm^2$ on the sample web.

Permeability was determined by means of a device that exposes the sample to an air velocity of 0.91 m/sec. The permeability, or pressure drop, is expressed in pascals (Pa).

DOP penetration efficiency was determined by means of an instrument that measures the percentage of DOP aerosols that penetrate a filter sample at a flow rate of 32 l/min. DOP particles have a size of about 0.3 microns in diameter.

Tensile strength was measured by means of a testing apparatus available from Instron Corporation. Samples of a size 7.62 cm wide by 15.24 cm long were cut, with the 15.24 cm dimension in the machine direction of the web. The clamping jaws were 2.54 cm wide and the jaws separation was 7.62 cm. The rate of separation was 12.70 cm/min.

Fiber diameters of the staple fibers and the meltblown fibers in the samples were determined by examining scanning electron photomicrographs and measuring the diameter of from about 40 to about 80 random individual fibers by means of a calibrated scale. The diameter is reported as the mean and standard deviation of the mean. Fiber diameters of samples made on "RANDO-WEBBER" equipment were measured by converting from denier to fiber diameter for a known material density.

The purpose of Examples 1 and 2 and the following two comparative examples is to compare the Dust Spot Efficiency of filters of the prior art with the Dust Spot Efficiency of filters of the present invention.

EXAMPLE 1

Figure 3:
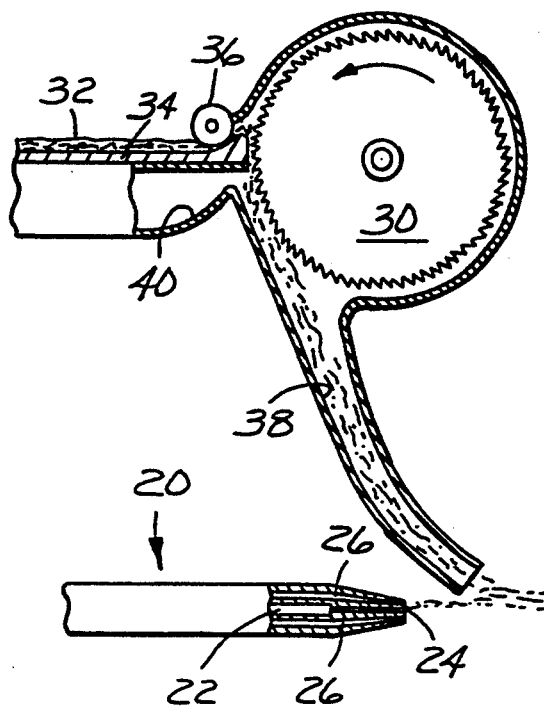
FIG. 3 is a schematic view of apparatus suitable for use in the process of the present invention.
Figure 3:
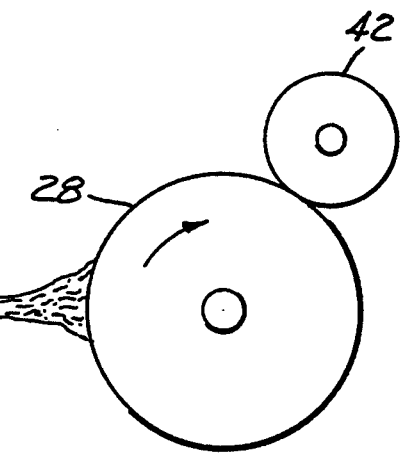

In this example, a composite fibrous web was prepared on the apparatus as shown in FIG. 3 using a mixture of 35% by weight electret staple fibers ("FILTRETE G-0108") and 65% by weight polymeric, meltblown fibers ("Exxon 3085" polypropylene). The web formed was planar in configuration. For purposes of testing in accordance with ASHRAE Standard 52-76 (1976), the web was pleated to form pleats approximately 19 mm deep, at a frequency of 39 pleats per meter. For purposes of testing other properties, the web was used in the planar form.

COMPARATIVE EXAMPLE A

In this comparative example, a "Koch" 40% filter, available from Koch Filter Corporation, was used. The filter was a cotton/polyester composite, and it bore no electrical charge. It had a pressure drop across it sufficiently low to make it suitable for use in commercial and residential heating, ventilating, and air conditioning systems. It was a pleated air filter having pleats approximately 19 mm deep at a frequency of 39 pleats per meter.

COMPARATIVE EXAMPLE B

In this comparative example, an air filter made by needle punching 70 $g/m^2$ of "FILTRETE" fibers onto a plastic netting fabric (Conwed Plastics) was used. It was a pleated air filter having pleats approximately 19 mm deep at a frequency of 39 pleats per meter.

EXAMPLE 2

In this example, a composite fibrous web was prepared on the apparatus as shown in FIG. 3 using a mixture of 31% by weight staple electret fibers ("FILTRETE G-0108") and 69% by weight polymeric, meltblown fibers ("FINA 3860X" polypropylene). The collecting apparatus included a first wire mesh screen (the restraining screen) having approximately 6.4 mm square openings in register with a second wire mesh screen (the pillow-forming screen) having hexagonal openings with a cell size approximately 27.5 mm, flat-to-flat. The pillow-forming screen was separated from the restraining screen by means of wooden dowels which provided approximately 20.0 mm separation between the screens. The web first contacted the pillow-forming screen and the apexes of the pillows contacted and were restrained by the restraining screen.

The filters of Examples 1 and 2 and Comparative Examples A and B were tested for filtration properties, and the results are set forth in Table I.

TABLE I

| Example No. | Initial resistance (Pa) | Initial Dust Spot Efficiency (%) | Average Dust Spot Efficiency (124.54 Pa) (%) | Average Dust Spot Efficiency (249.09 Pa) (%) | Dust holding capacity (124.54 Pa) (g) | Dust holding capacity (249.09 Pa) (g) | Arrestance (124.54 Pa) (wt %) | Arrestance (249.09 Pa) (wt %) |
|---|---|---|---|---|---|---|---|---|
| A* | 42.35 | 8.1 | 24 | 28 | 43 | 99 | 90 | 92 |
| B* | 54.80 | 44.5 | 36 | 30 | 30 | 60 | 97 | 98 |
| 1 | 57.29 | 40.9 | 41 | 44 | 37 | 84 | 92 | 93 |
| 2 | 64.74 | 45.5 | 40 | 36 | 26.4** | 68** | 89 | 88 |

*Comparative Example
**The dust holding capacity for Example 2 was calculated by multiplying test results of a 0.093 $m^2$ sample web by 4 to compare to other samples in Table I, because the face area of the web of Example 2 was one-fourth the face area of the other webs in Table I.

Results of the tests show an Average Dust Spot Efficiency rating of 41% at 12.7 mm water pressure drop for the filtration material of Example 1. The commercial filter (Koch "MULTI-PLEAT" 40) had an Average Dust Spot Efficiency rating of 24%. The Initial Dust Spot Efficiency of the filter of Example 1 was 40.9%, compared to 8.1% for the commercial filter. The initial filter resistance and dust holding capacity of the commercial filter and that of Example 1 was similar. The data indicate that the filtration material of this invention is two to five times more efficient (Initial Dust Spot efficiency) than the commercially available filter, with similar pressure drop and holding capacity. The filtration material of this invention is about 10 to 15 times more efficient (Quality Factor) than a standard residential air filter.

The purpose of Examples 3, 4, 5, and 6 and Comparative Examples C, D, and E is to compare the Quality Factor (Q) of filters of the prior art with the Quality Factor (Q) of filters of the present invention.

EXAMPLE 3

In this example, a web was made in the same manner as was that of Example 1, with the exception being that a mixture of 25% by weight staple electret fibers ("FILTRETE G-0108") and 75% by weight, polymeric, meltblown fibers ("Exxon 3085" polypropylene) was used.

EXAMPLE 4

In this example, a web was made in the same manner as that of Example 1, with the exceptions being that a mixture of 35% by weight staple electret fibers ("FILTRETE G-0108") and 65% by weight, polymeric meltblown fibers ("FINA 3860X" polypropylene) was used and the diameter of the meltblown fibers was increased from 11.1 $\mu$m to 16.25 $\mu$m.

EXAMPLE 5

In this example, a web was made in the same manner as that of Example 1, with the exceptions being that a mixture of 60% by weight staple electret fibers ("FILTRETE G-0108") and 40% by weight meltblown fibers ("FINA 3860X" polypropylene) was used and the diameter of the continuous fibers was increased from 11.1 $\mu$m to 22.37 $\mu$m.

EXAMPLE 6

In this example, a web was made in the same manner as that of Example 1, with the exceptions being that a mixture of 35% by weight electret staple fibers ("FILTRETE G-0108") and 65% by weight, polymeric, meltblown fibers ("FINA 3860X" polypropylene) was used and the diameter of the meltblown fibers was decreased from 11.1 $\mu$m to 3.92 $\mu$m.

COMPARATIVE EXAMPLES C, D, AND E

In the comparative examples, the webs for preparing the sample air filters were processed by means of "RANDO-WEBBER" airlaying equipment. All the fibers making up the web were staple fibers. The compositions of the webs are set forth in Table II.

TABLE II

| Example No. | Diameter of meltblown fiber ($\mu$m) | Basis weight (g/m$^2$) | DOP penetration (%) | $\Delta$P on DOP test (Pa) | Q* (Pa$^{-1}$) | Machine Direction tensile strength (kg) | Thickness (mm) | $\Delta$P at 0.91 m/sec (Pa) |
|---|---|---|---|---|---|---|---|---|
| A** | — | 112 | 96 | 2.05 | 0.02 | 4.50 | 1.65 | 29.9 |
| B | — | 98 | 44 | 1.67 | 0.49 | — | — | 34.9 |
| 1 | 11.1 | 106 | 50 | 1.18 | 0.58 | 1.72 | 1.90 | 34.9 |
| 2 | — | 141 | 42 | 1.27 | 0.68 | — | — | 35.3 |
| 3 | 11.1 | 103 | 66 | 1.28 | 0.33 | 2.13 | 1.90 | 39.8 |
| 4 | 16.2 | 102 | 44 | 0.98 | 0.84 | 0.88 | 3.18 | 24.9 |
| 5 | 22.4 | 102 | 37 | 1.08 | 0.97 | 0.27 | 3.43 | 24.9 |
| 6 | 3.9 | 98 | 53 | 2.75 | 0.23 | 1.25 | 2.16 | 49.6 |
| C$^1$ | — | 93 | 72 | 2.65 | 0.12 | 0.25 | 3.43 | 54.9 |
| D$^2$ | — | 104 | 72 | 3.04 | 0.11 | 0.14 | 4.19 | 52.3 |
| E$^3$ | — | 87 | 63 | 1.08 | 0.46 | 0.25 | 3.68 | 27.4 |

*Q = $\dfrac{-\ln(\% \text{ DOP Penetration}/100)}{\Delta P}$

**Koch Filter Corporation, Multi-Pleat standard capacity pleated panel filter
$^1$The filtration material consisted completely of staple fibers 25% electret ("FILTRETE") and 75% polyethylene terephthalate (1.5 Denier or 12.5 $\mu$m in diameter)
$^2$The filtration material consisted completely of staple fibers 29% electret ("FILTRETE") and 71% polyethylene terephthalate (3 Denier or 17.7 $\mu$m in diameter)
$^3$The filtration material consisted completely of staple fibers 64% electret ("FILTRETE") and 27% polyethylene terephthalate (6 Denier or 25.1 $\mu$m in diameter), and 9% polyethylene terephthalate (4 Denier or 20.5 $\mu$m in diameter)

There was a considerable degree of difficulty in preparing the webs of Comparative Examples C, D, and E because of the high level of static charge on the "FILTRETE G-0108" fibers. Despite these difficulties, several combinations were made. The webs were then needle punched to obtain adequate mechanical strength for handling and for testing.

Comparative examples were compared with inventive examples on the basis of (a) weight of web, (b) percentage of electrically charged fibers in the web, and (c) diameter of fibers in the web. Example 3 was compared to Comparative Example C, Example 4 was compared to Comparative Example D, and Example 5 was compared to Comparative Example E. The webs of this invention outperformed conventional webs made on "RANDO-WEBBER" apparatus in filtration properties and strength. In the three pairs of samples compared, the filtration material of a given example of the present invention had a Quality Factor (Q) approximately twice as high as that of the corresponding comparative example. In the three pairs of samples compared, the percent penetration of DOP aerosol through the filtration material of a given example of the present invention was lower than that of the corresponding comparative example.

EXAMPLE 7

Nonplanar webs of filtration material having increased effective area for a given slot or duct cross-section were made in an integrated one-step collection process by using a collector having an alternating open and closed surface formed by parallel rods separated from a restraining screen by a frame.

The collecting apparatus (see FIG. 7) comprised a rectangular frame 82 (406 mm by 508 mm) having a depth of 25.4 mm. To one side 82a of frame 82 was adhered transversely across the length thereof a plurality of cylindrical wooden rods 84 (6.4 mm diameter) in parallel, separated from each other by 32 mm, center to center. To the other side 82b of frame 82 was fastened a rectangular wire mesh screen 86, having openings approximately 6.4 mm square.

This assembly, with the rod-bearing side positioned to intercept the stream of fibers, was passed through a stream of fibers consisting of 35% by weight staple electret fibers ("FILTRETE G-0108") and 65% by weight, polymeric, meltblown fibers (polypropylene). The resulting web collected from the surface of the rod-bearing assembly had a fixed corrugated configuration providing the increased effective area desired. It also had integrity, strength, and homogeneity comparable to webs produced by processes of this invention described previously.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A web comprising:
   (a) a mass of meltblown, non-charged fibers made of polymeric material; and
   (b) staple, electrically charged fibers randomly dispersed among the meltblown fibers, wherein the pressure drop through the web is less than about 74.7 pascals (Pa) at 0.91 m/sec air velocity and the value of Quality Factor (Q) is from at least about $0.05$ $Pa^{-1}$ to about $5.0$ $Pa^{-1}$, said web having a weight of from 40 g/m² to 150 g/m².

2. The web of claim 1, wherein the concentration of said electrically charged staple fibers range from about 10% by weight to about 80% by weight of the web.

3. The web of claim 1, wherein the average diameter of said meltblown fibers is from about 0.1 micrometer to about 50 micrometers.

4. The web of claim 3, wherein the average diameter of said meltblown fibers is at least about micrometers.

5. The web of claim 1, wherein the average length-to-diameter ratio of said meltblown fibers is at least about 5000:1.

6. The web of claim 1, wherein the average length of the staple, electrically charged fibers is from about 6.5 mm to about 50 mm.

7. The web of claim 1, wherein at least a portion of said electrically charged fibers contain a positive charge only.

8. The web of claim 1, wherein at least a portion of said electrically charged fibers contain a negative charge only.

9. The web of claim 1, wherein at least a portion of said electrically charged fibers have a permanent state of electric polarization.

10. The web of claim 1, wherein the meltblown fibers are made from a polymeric material selected from the group consisting of polyolefins, polyesters, polyurethanes, and mixtures thereof.

11. The web of claim 10, wherein the meltblown polymeric fibers are made of polypropylene.

12. The web of claim 1, wherein the value of Quality Factor (Q) is at least about $0.1$ $Pa^{-1}$.

13. The web of claim 1, wherein said web comprises a plurality of pillowed regions spaced from one another by planar regions, said pillowed regions displaced to one side of said planar regions.

14. The web of claim 1, wherein said web comprises a plurality of pleats running transversely across said web.

* * * * *

UNITED STATES PATENT AND TRADEMARK OFFICE
CERTIFICATE OF CORRECTION

PATENT NO. : 5,350,620
DATED : September 27, 1994
INVENTOR(S) : Douglas C. Sundet and Albert H. Fox It is certified that error appears in the above-indentified patent and that said Letters Patent is hereby corrected as shown below:

Col. 3, line 60, delete "25% to about 25%" and insert --25% to about 35%--.

Col. 16, line 11, after "about" insert --10--.

Signed and Sealed this

Sixth Day of June, 1995

Attest:

BRUCE LEHMAN

*Attesting Officer*  *Commissioner of Patents and Trademarks*